US007130173B2

(12) United States Patent
Barewz

(10) Patent No.: US 7,130,173 B2
(45) Date of Patent: Oct. 31, 2006

(54) DIRECT FORCE ARMATURE FOR A TRIP ASSEMBLY

(75) Inventor: David W Barewz, Solon, IA (US)

(73) Assignee: Square D Company, Palatine, IL (US)

( * ) Notice: Subject to any disclaimer, the term of this patent is extended or adjusted under 35 U.S.C. 154(b) by 370 days.

(21) Appl. No.: 10/615,040

(22) Filed: Jul. 8, 2003

(65) Prior Publication Data

US 2005/0007716 A1 Jan. 13, 2005

(51) Int. Cl.
*H02H 3/08* (2006.01)

(52) U.S. Cl. .......................... 361/93.1; 335/9; 335/35; 335/41; 335/42

(58) Field of Classification Search ............... 361/93.1; 335/35, 41, 42, 9

See application file for complete search history.

(56) References Cited

U.S. PATENT DOCUMENTS

| | | | | |
|---|---|---|---|---|
| 2,050,258 | A * | 8/1936 | Bemis | 249/34 |
| 2,942,079 | A | 6/1960 | Dorfman | 200/106 |
| 3,845,432 | A * | 10/1974 | Heberlein et al. | 335/176 |
| 4,074,218 | A * | 2/1978 | Salvati et al. | 335/176 |
| 4,963,848 | A | 10/1990 | Palmer et al. | 335/172 |
| 5,831,499 | A * | 11/1998 | Batteux et al. | 335/9 |
| 6,218,920 | B1 * | 4/2001 | Reichard et al. | 335/176 |
| 6,433,290 | B1 * | 8/2002 | Ulerich et al. | 200/308 |

FOREIGN PATENT DOCUMENTS

| | | | |
|---|---|---|---|
| DE | 100 36 351 | A1 | 2/2002 |
| EP | 1 026 719 | A2 | 1/2000 |
| FR | 800736 | A | 7/1936 |
| FR | 1 072 669 | A | 9/1954 |
| WO | WO 03/054898 | A1 | 7/2003 |

OTHER PUBLICATIONS

International Search Report for International Application No. PCT/US2004/020982, dated Oct. 26, 2004 (2 pages), Information on patent family members (1 page), and PCT Written Opinion Of The International Searching Authority (PCT Rule 43bis.1) (5 pages).

Catalog Page: Compact® NSF150 and NSF250 Circuit Breakers (1 page) (dated Mar. 1999).

Catalog Page: Compact NSF and NSJ 150 to 600 A circuit breakers (2 pages) (dated 1997).

* cited by examiner

*Primary Examiner*—Stephen W. Jackson
*Assistant Examiner*—Terrence Willoughby

(57) ABSTRACT

The invention relates to a trip assembly for use in an electro-mechanical device, such as a circuit breaker. The trip assembly is used for interrupting the flow of current upon the detection of excess current in a circuit breaker and comprises a trip bar, a stationary armature bracket, a movable armature, and a spring. The movable armature includes a first end coupled to a base portion of the armature bracket, and a trip-actuating surface being disposed proximate a trip finger of the trip bar. The spring is directly coupled at its respective ends to a spring-support portion of the armature bracket and to a spring tab of the movable armature.

20 Claims, 3 Drawing Sheets

DIRECT FORCE ARMATURE FOR A TRIP ASSEMBLY

FIELD OF THE INVENTION

This invention is directed generally to electro-mechanical devices and, more specifically, to a direct force armature for use in a circuit breaker trip assembly.

BACKGROUND OF THE INVENTION

Circuit breakers are well-known and commonly used to provide automatic circuit interruption to a monitored circuit when undesired overcurrent conditions occur. Some of these overcurrent conditions include, but are not limited to, overload conditions, ground faults, and short-circuit conditions. The component that senses and switches the circuit breaker to a TRIPPED position, i.e., a position in which the flow of current through the circuit breaker is interrupted, is a trip assembly. The trip assembly uses, in general, a spring-biased latch mechanism to force a movable contact away from a stationary contact.

Generally, a trip assembly includes a magnetic yoke, a movable armature, and a trip bar, which includes at least one trip finger. The movable armature is positioned such that a predetermined distance, a magnetic gap, exists between the movable armature and the magnetic yoke. The magnetic gap can be used to determine the current level required to trip the circuit breaker. For example, assuming that all other conditions are the same, a higher magnetic gap will require a higher level of current for tripping the circuit breaker, while a lower magnetic gap will require a lower level of current for tripping the circuit breaker. When the current level rises above a predetermined level, a magnetic force is generated through the magnetic yoke and the movable armature is magnetically attracted towards the magnetic yoke. During its motion toward the magnetic yoke, the movable armature comes in contact with the trip finger and actuates the trip bar, which in turn switches the circuit breaker to the TRIPPED position.

In one type of trip assembly, used in a calibrating circuit breaker, the movable armature is connected to the trip bar using a spring, which has one end directly connected to the movable armature and one end connected to the trip bar via a calibration screw. Because of manufacturing defects, the magnetic gap generally varies from pole to pole and, consequently, each pole of a circuit breaker must be individually calibrated. By adjusting the screw, which results in either increasing or decreasing the magnetic gap, each pole of the circuit breaker can be calibrated to perform as intended.

One problem associated with this type of trip assembly is that each of the circuit breaker poles must undergo a calibration process before installation, a process that is expensive and time-consuming. Additionally, some circuit breakers have to go through a recalibration process after installation, a process that increases the cost and decreases the productivity associated with the use of the circuit breakers. Eliminating the calibration process and the recalibration process associated with the manufacturing and the use of circuit breakers would result in decreased costs and increased productivity. The present invention exploits these and other advantages.

SUMMARY OF THE INVENTION

Briefly, in accordance with the foregoing, the invention relates to a trip assembly for use in an electro-mechanical device, such as a circuit breaker. In one embodiment, the trip assembly is used for interrupting the flow of current upon the detection of excess current in a circuit breaker and comprises a trip bar, a stationary armature bracket, a movable armature, and a spring. The movable armature includes a first end coupled to a base portion of the armature bracket, and a trip-actuating surface being disposed proximate a trip finger of the trip bar. The spring is directly coupled at its respective ends to a spring-support portion of the armature bracket and to a spring tab of the movable armature.

BRIEF DESCRIPTION OF THE DRAWINGS

The foregoing and other advantages of the invention will become apparent upon reading the following detailed description and upon reference to the drawings.

Figure 1:
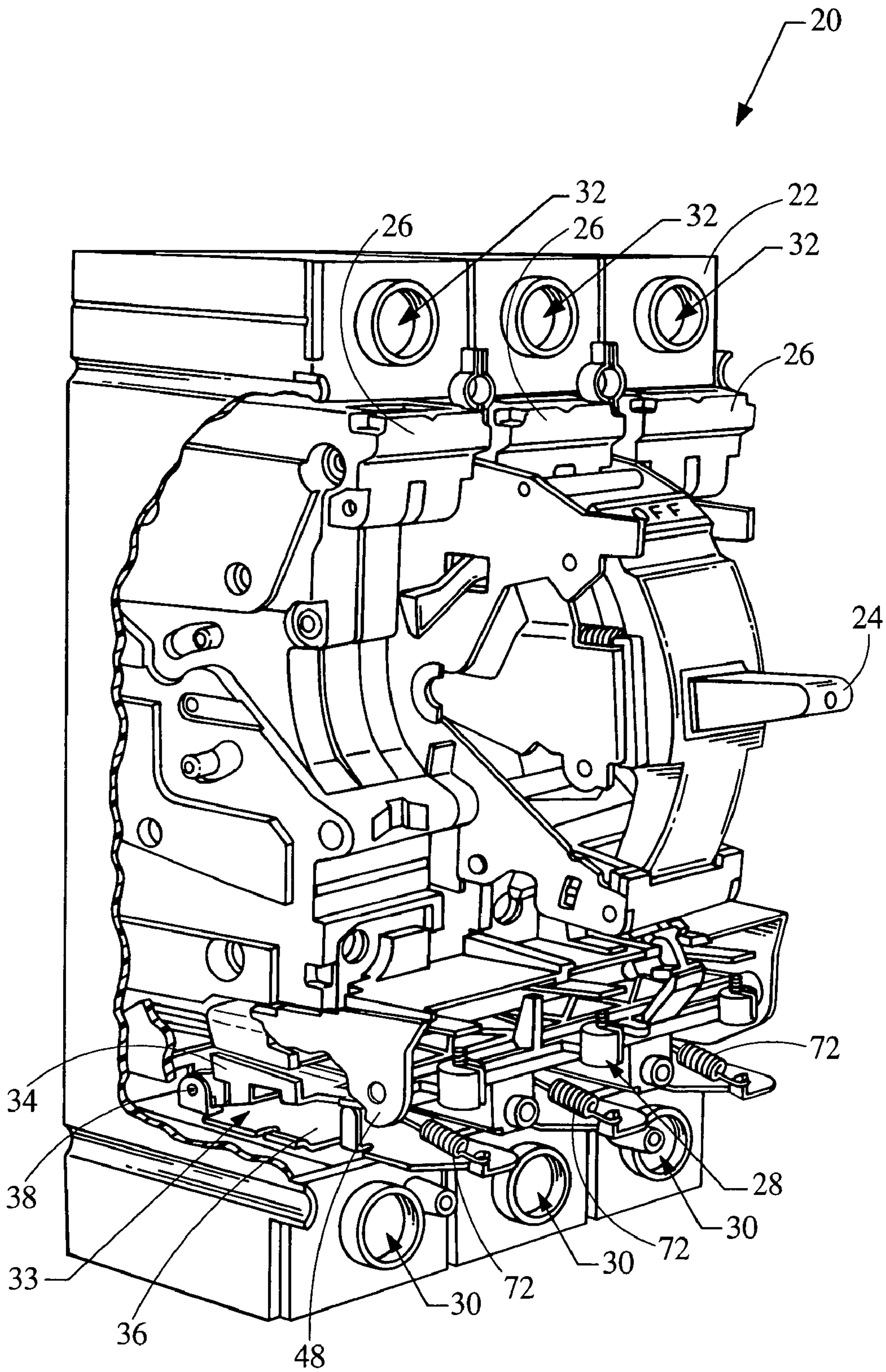
FIG. 1 is a perspective cutaway view of a circuit breaker embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENT

Referring now to the drawings, and initially to FIG. 1, an electro-mechanical device such as a circuit breaker 20 will be described in general. The circuit breaker 20 generally includes a base 22, a handle 24, a plurality of poles 26, and a trip assembly 28.

In general, most components of the circuit breaker 20 are installed on the base 22 and secured therein after a cover is attached to the base 22. The handle 24 protrudes through the cover for manual resetting of the circuit breaker 20. The handle 24 is also adapted to serve as a visual indication of one of several positions of the circuit breaker 20. One position of the circuit breaker 20 is an ON position. When the circuit breaker 20 is in the ON position, current flows unrestricted through the circuit breaker 20 and, therefore, through the electrical device or circuit that the circuit breaker is designed to protect. Another position of the circuit breaker 20 is a TRIPPED position. The TRIPPED position interrupts the flow of current through the circuit breaker 20 and, consequently, through the electrical device or circuit that the circuit breaker is designed to protect.

The TRIPPED position is caused by the presence of a higher current than the rated current for the circuit breaker 20 over a specified period of time. The exposure of the circuit breaker 20 over the specified period of time to a current that exceeds the rated current by a predetermined threshold activates the trip assembly 28. Activation of the trip assembly 28 causes a switching mechanism, which is included in the pole 26, to interrupt current flow through the circuit breaker 20.

Current enters the circuit breaker 20 through a line terminal located near a line-terminal portion 32 and exits the circuit breaker 20 through a load terminal located near a load-terminal portion 30. As the current passes through the pole 26, the current also passes through a pair of contacts, a movable contact and a stationary contact. The movable contact is attached to a blade, which is connected to the switching mechanism. In the ON position the movable contact contacts the stationary contact, while in the TRIPPED position, the movable contact is separated from the stationary contact.

The trip assembly 28 is an assembly that drives the tripping action and generally includes an armature mechanism 33 which includes a movable armature 34 connected to an armature bracket 36. The movable armature 34 is rotatable around a base part 38 of the armature bracket 36, and the movable armature 34 is positioned proximate a trip bar 40. Continued counterclockwise rotation of the movable armature 34 eventually causes the trip bar 40 to activate the switching mechanism, which in turn causes the movable contact connected to the blade to move away from the stationary contact. As explained above, the switching mechanism is activated when the current exceeds the rated current by a predetermined threshold over a specified period of time.

Figure 2A:
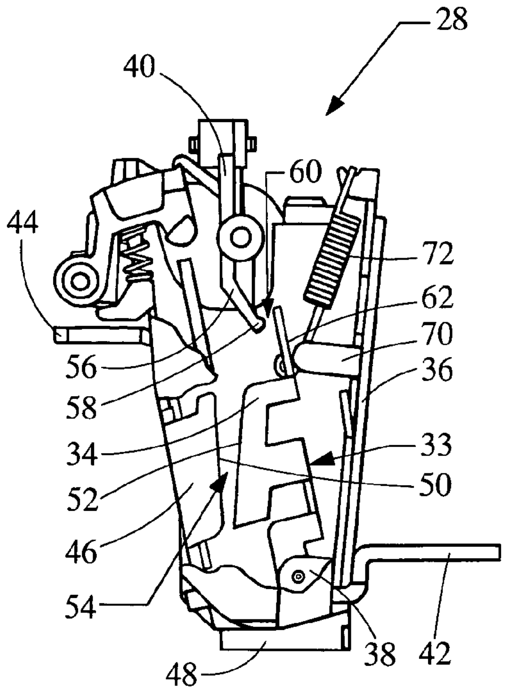
FIG. 2A is an end view of a trip assembly in accordance with one aspect of the present invention, shown in an ON position.
Figure 3:
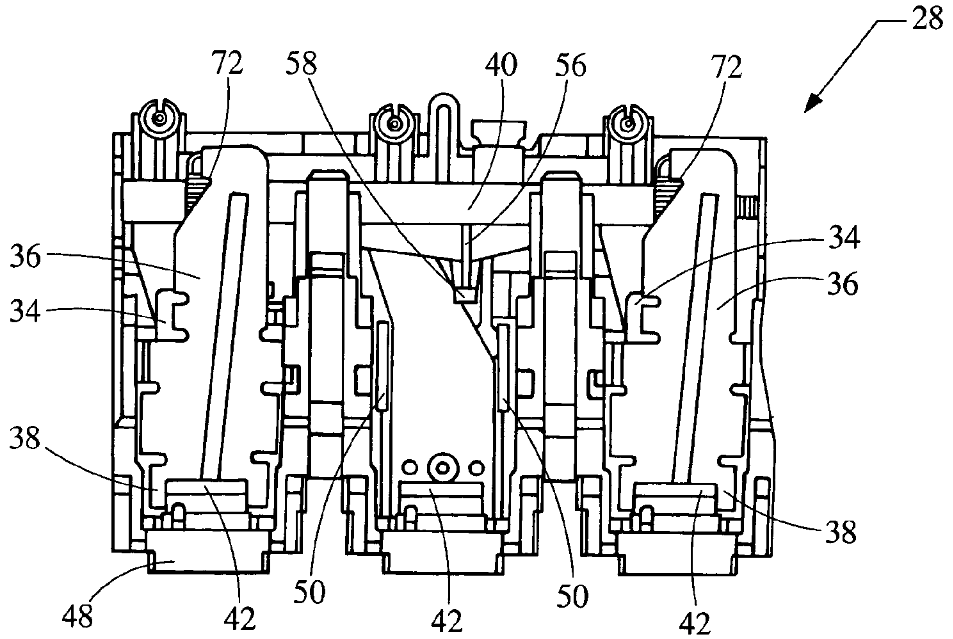
FIG. 3 is a front view of the trip assembly of FIG. 2A, shown with a middle armature mechanism removed.

Referring now to FIGS. 2A and 3, the trip assembly 28 will be described in more detail. The trip assembly 28 further includes a load terminal 42, an upper-Ampoule terminal 44, and a stationary magnetic yoke 46. The load terminal 42 and the upper-Ampoule terminal 44 are formed from one continuous metal part, and current passing through the trip assembly 28 enters through the upper-Ampoule terminal 44 and exits through the load terminal 42. The load terminal 42 is located below the armature mechanism 33, being connected to the armature bracket 36 and to a trip-assembly base 48 by using a screw inserted from below.

The yoke 46 is formed from a single, magnetic part and is located opposite the movable armature 34 and below the upper-Ampoule terminal 44. The yoke 46 includes two armature surfaces 50 which are parallel to each other and which are near corresponding yoke surfaces 52 of the movable armature 34. In one embodiment of the present invention, the armature surfaces 50 are parallel to the corresponding yoke surfaces 52. In other embodiments, the armature surfaces 50 are not parallel to the corresponding yoke surfaces 52. A magnetic gap 54 separates the armature surfaces 50 from the corresponding yoke surfaces 52.

The trip bar 40, which is made from a plastic material and which is secured to the trip assembly base 48, includes a finger 56 for each one of the poles 26. The finger 56 includes a contact edge 58 which is separated by a trip-bar gap 60 from a finger surface 62 of the movable armature 34. The contact edge 58 is preferably rolled for resulting in a smoother contact between the contact edge 58 and the movable armature 34.

Figure 4A:
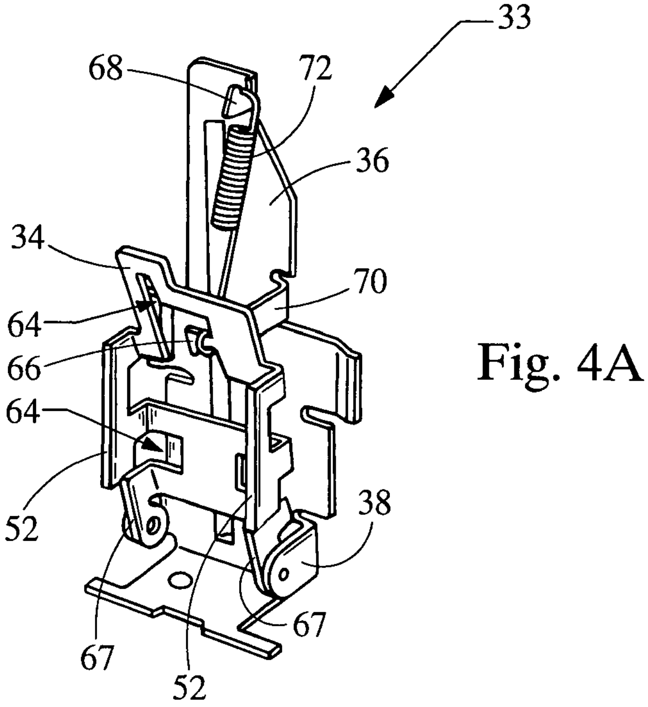
FIG. 4A is a perspective view of an armature mechanism in accordance with one aspect of the present invention.
Figure 4B:
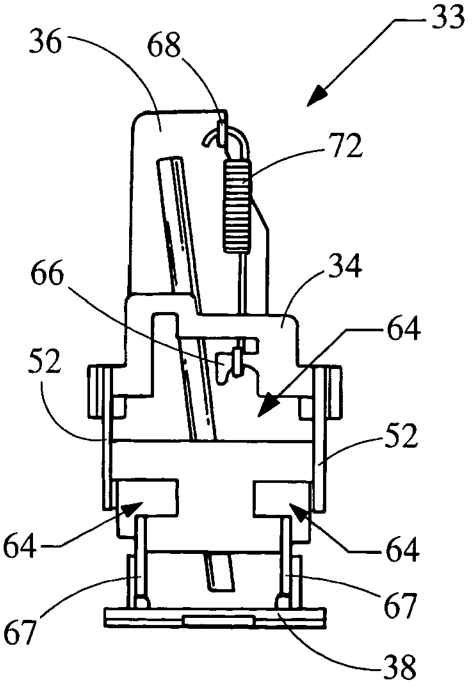
FIG. 4B is a front view of the armature mechanism shown in FIG. 4A.
Figure 4C:
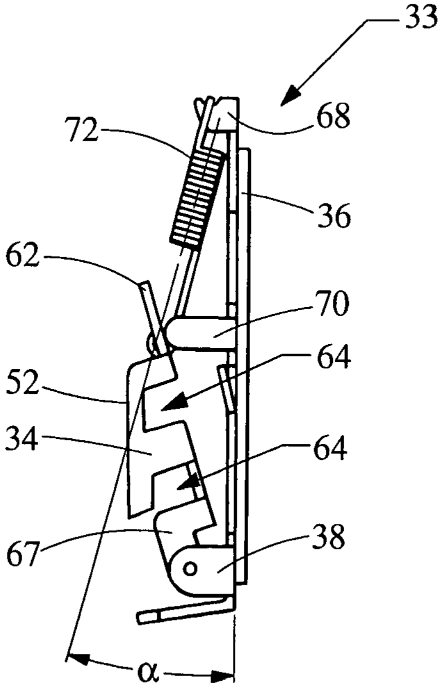
FIG. 4C is an end view of the armature mechanism shown in FIG. 4A.

Referring now to FIGS. 4A–4C, the armature mechanism 33 will be described in more detail. The movable armature 34 includes a plurality of cutouts 64, a spring tab 66, and two hinged sections 67. The hinged sections 67 are rotatively connected to the base part 38 of the armature bracket 36. The armature bracket 36 includes a spring-support part 68 and a stop tab 70. A spring 72 has one end directly coupled to the spring-support part 68 of the armature bracket 36 and another end directly coupled to the spring tab 66 of the movable armature 34. Thus, by directly coupling the spring 72 to the movable armature 34 and to the armature bracket 36, there is no need for intermediate components such as the calibration screw used in the prior art. In one embodiment of the present invention the movable armature 34 and the armature bracket 36 are both made of a soft steel, such as a 1010 steel which has magnetic properties. The spring 72 is inclined at an angle $\alpha$ relative to a vertical axis of the armature bracket 36, the vertical axis being perpendicular to the base part 38 of the armature bracket 36. In one embodiment, the angle $\alpha$ is approximately 17 degrees.

The spring 72 holds the movable armature 34 in tension, pulling the movable armature 34 towards the armature bracket 36, which is stationary. The stop tab 70 limits the movement of the movable armature 34, stopping the movable armature 34 at a predetermined point away from the armature bracket 36. Although the movable armature 34 can rotate in a counterclockwise motion, the movable armature 34 can rotate in a clockwise motion only until it makes contact with the stop tab 70.

The force required to displace the movable armature 34, or the displacement force, depends on at least the following parameters: the characteristics of the spring 72, the positioning of the spring 72, the mass of the movable armature 34, and the friction force occurring at the interface between the hinged sections 67 and the base part 38. According to well-known physics principles, a spring force is determined according to the following relationship:

$$F=kx,$$

where F is the force of the spring 72, k is a spring constant that describes the spring 72, and x is the extension of the spring 72. According to the above relationship, the force required to displace the movable armature 34 away from the stop tab 70 can be determined by changing k and x of spring 72. A larger value of k and/or x means that a higher force is required for displacing the movable armature 34, while a smaller k and/or x means that a lower force is required for displacing the movable armature 34.

The positioning of the spring 72 relative to the movable armature 34 can also affect the force required to displace the movable armature 34. For example, if the spring force is kept constant (e.g., by keeping the spring extension x constant), then changing angle $\alpha$ can either increase or decrease the displacement force. If the orientation of the spring 72 is changed such that the end of the spring 72 that is coupled to the spring-support part 68 is moved toward the trip bar 40, then the displacement force will tend to decrease (assuming that the spring force is kept constant). The reason for the change in the displacement force is the increase or decrease in the spring leverage, also referred to as a mechanical advantage, provided by the change in angle $\alpha$.

The mechanical advantage is a feature related to well-known physics principles, which state that two equal but opposite forces will cancel each other out. Thus, because the direction of the displacement force is perpendicular and toward the armature surfaces 50 of the yoke 46, an equal and directly opposite force, such as a spring force directed perpendicular and away from the armature surfaces 50, can cancel the effect of the displacement force. If the spring force is parallel to the displacement force, then the entire spring force is used to counter the displacement force. However, if the spring force is not parallel to the displacement force, although it is still directed opposite the displacement force, a higher spring force will be required to achieve the same result it would have been achieved if the two forces were parallel to each other. This is because, according to fundamental physics principles, the spring force will have two components, one component pulling away from and in a parallel direction to the displacement force and one component pulling away from and in a perpendicular direction to the displacement force. The perpendicular component does not contribute to countering the displacement force, and, assuming the spring force is kept constant, the spring force is reduced as the angle $\alpha$ changes. Whereas the entire spring force is used to counter the displacement force when the spring 72 is in a plane parallel to the displacement force, only part of the spring force is used to counter the displacement force when the spring 72 is not in a plane parallel to the displacement force. In short, if the spring force remains constant, as the angle $\alpha$ increases the leverage or mechanical advantage increases and the displacement force increases, which means that the trip current requirement increases. Conversely, if the angle $\alpha$ decreases then the mechanical advantage decreases and the displacement force decreases, which means that the trip current requirement decreases. An optimally selected angle $\alpha$ can be selected to provide an adequate spring force for a wide range of trip current requirements.

The mass of the movable armature 34 and the friction force occurring at the interface between the hinged sections 67 and the base part 38 also affect the displacement force. Decreasing the mass of the movable armature 34 can decrease the displacement force, and increasing the mass of the movable armature 34 can increase the displacement force. Similarly, a reduction in the friction force between the movable armature 34 and the armature bracket 36 can reduce the displacement force, while an increase in the friction force will increase the displacement force. Besides affecting the displacement force, the mass of the movable armature 34 and the friction force between the movable armature 34 and the armature bracket 36 can also affect the speed of displacing the movable armature 34, which is directly proportional to the speed of the tripping action. A lower mass will generally increase the speed of displacement, while a larger mass will generally decrease the speed of displacement. Similarly, a lower friction force will generally increase the speed of displacement, while a larger friction force will generally decrease the speed of displacement. The plurality of cutouts 64 help in reducing the mass of the movable armature 34 and, therefore, in increasing the speed of the tripping action. Additionally, the magnetic properties of the movable armature 34 and the magnetic properties of the yoke 46 can also affect the displacement force.

Figure 2B:
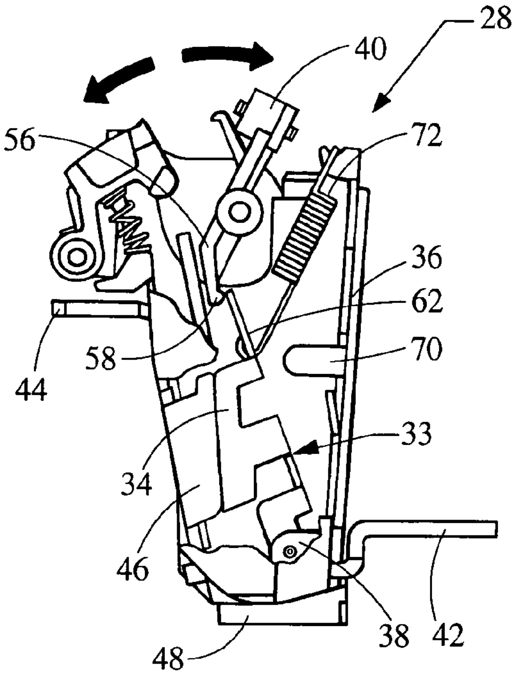
FIG. 2B shows the trip assembly of FIG. 2A in a TRIPPED position.

Referring now to FIGS. 2A and 2B, the tripping action of the trip assembly 28 will be described in more detail. In the ON position, depicted in FIG. 2A, the movable armature 34 rests against the stop tab 70. When the current passing through the trip assembly 28 exceeds a predetermined level, a magnetic force is generated by the yoke 46 and the yoke surfaces 52 of the movable armature 34 are pulled toward the armature surfaces 50 of the yoke 46. As the movable armature 34 moves toward the yoke 46, the magnetic gap 54 and the trip-bar gap 60 decrease. Eventually, the finger surface 62 makes contact with the contact edge 58 pushing the trip finger 56 and, consequently, causing the trip bar 40 to rotate in a clockwise direction. The rotation of the trip bar 40 causes the tripping action discussed above which activates the switching mechanism, resulting in the circuit breaker being in the TRIPPED position. Note that the above-described tripping action generally occurs during a very brief period of time.

Although FIG. 2*b* shows the armature surfaces 50 and the yoke surfaces 52 in contact with each other, contact of the respective surfaces is not necessary for the tripping action to occur. For example, in one embodiment the magnetic gap 54 is 0.04 inches when the tripping action occurs. The size of the magnetic gap 54 is directly proportional to the magnetic force required to displace the movable armature 34 (e.g., a larger magnetic gap 54 will require a larger magnetic force to displace the movable armature 34, while a smaller magnetic gap 54 will require a smaller magnetic force to displace the movable armature 34). Similarly, the size of the trip-bar gap 60 is directly proportional to the magnetic force required to displace the movable armature 34. For example, in one embodiment the magnetic gap 54 can range from about 0.085 inches to about 0.095 inches, and can be optimally fixed at 0.090 inches. In another embodiment, the trip-bar gap can range from about 0.040 inches to about 0.050 inches, and can be optimally fixed at 0.046 inches.

When the finger surface 62 of the movable armature 34 makes contact with the contact edge 58 of the trip finger 56, the rolled shape of the contact edge 58 allows the finger surface 62 to rotate around the contact edge 58, resulting in a smoother and more efficient motion. The rolled shape of the contact edge 58 helps contribute to obtaining a faster tripping action.

As is well-known in the art, a circuit breaker is designed for a wide range of current ratings and then the circuit breaker is calibrated for a specific current rating. For example, the circuit breaker 20 is designed to handle current ratings ranging from at least 15 amperes to at least 150 amperes. However, instead of using the prior-art calibration method, which is expensive and time-consuming, the present invention calibration method only requires the replacement of the spring 72. While the prior art calibration process requires the adjustments to be made in a laboratory setting, the present invention only requires the replacement of the spring 72 to achieve the specific current rating. For example, suppose that the circuit breaker 20 is designed to trip at a current level ranging between 15 amperes and 30 amperes (this application would include a 15 amperes breaker, a 20 amperes breaker, a 25 amperes breaker, and a 30 amperes breaker), and that in a different application the circuit breaker 20 is required to trip at a current level ranging between 35 amperes and 50 amperes (this application would include a 35 amperes breaker, a 40 amperes breaker, a 45 amperes breaker, and a 50 amperes breaker). For the circuit breaker 20 to successfully perform in the 35–50 amperes range, the only necessary change would be the replacement of the original spring 72 with a new spring 72 that has a larger spring constant k. To achieve other current trip ratings, higher or lower, the spring 72 only needs to have the appropriate spring properties. For example, in one embodiment of the present invention, the circuit breaker 20 can be used for any trip current rating ranging between 15 amperes and 150 amperes by selecting the appropriately-rated spring 72 from a group of about six different springs 72. For example, the group of the six different springs 72 can be selected so that the spring force ranges from about 0.35 lbs. to about 1.0 lbs., and the spring constant ranges from about 2.5 lbs./inch to about 6.0 lbs./inch.

Another problem that the current invention solves is related to variations in the magnetic gap 54. Because of certain manufacturing defects and inconsistencies, the magnetic gap 54 can vary within a certain tolerance from the desired value. In the prior art, these magnetic gap variations could be eliminated only by calibrating the circuit breaker 20. However, the current invention introduces a cancellation effect that reduces the effect of the magnetic gap variations. For example, as discussed above, if the magnetic gap 54 increases then the magnetic force required to displace the movable armature 34 also increases. However, if the magnetic gap 54 increases then the force applied by the spring 72 decreases (e.g., because the extension x of the spring 72 decreases). Thus, the increase in the magnetic gap 54, which translates into a requirement for a larger magnetic force, is cancelled by the decrease in the direct displacement force, which is applied by the spring 72 on the movable armature 34. Similarly, if the magnetic gap 54 decreases then the magnetic force required to displace the movable armature 34 also decreases. However, this decrease in the magnetic force is countered by an increase in the force applied by the spring 72.

Another problem that the present invention solves is related to the trip current variability. Trip current variability is related to deviations of the current trip level from the specified trip rating of the circuit breaker 20. For example purposes, the circuit breaker 20 is assumed to be a 30 amperes breaker. To pass testing requirements the 30 amperes breaker is expected to hold at about 300 amperes (i.e., not trip), and it will be generally expected to trip at about 450 amperes, with a plus or minus variation of as much as about 150 amperes. Thus, even if the 30 amperes breaker trips at about 600 amperes, the borderline for testing requirements, it will still pass the testing requirements. However, the functionality and safety of the 30 amperes breaker is directly proportional to the variation in the trip current. Although the breaker can pass testing by being able to hold without tripping at a current level as high as 600 amperes, and by tripping at a current level as low as 300 amperes, it might be desired in practice to keep this 300 amperes range to a minimum. For example, if the breaker tends to trip much under the 450 amperes level, then it can become a nuisance for the protected circuit because the breaker will trip at current levels for which the protected circuit was designed to operate. Similarly, in the previous example, if the breaker tends to trip much above the 450 amperes level, then it can become a hazard for the protected circuit because the breaker will trip at current levels for which the protected circuit was not designed to operate. Clearly, a reduced current variability results in a safer, more functional, and more cost effective circuit breaker 20. In comparison to prior art circuit breakers, in which the current variability has an average standard deviation that generally ranges from about 28 percent to about 36 percent, the current invention can reduce the current variability to an average standard deviation of at least as little as about 6 percent.

Yet another problem solved by the present invention is related to the trip current repeatability range. The trip current repeatability range is related to the consistency with which the circuit breaker 20 can be tripped a number of times over a period of time, having each tripping occurring within the same current range. Thus, it is desirable to have the circuit breaker 20 trip within a certain range every time a tripping condition occurs. While trip current variability is related to how much does the trip current vary from the expected trip level by averaging several breaker poles, the repeatability range is related to how consistently will the circuit breaker 20 trip within the variation range by tripping the same pole several times. For example, if the current variability is within a 6 percent average standard deviation, a good repeatability range ensures that every tripping action is within that six percent range. The current invention has been optimized to reduce the trip current repeatability range.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A trip assembly for interrupting the flow of current upon the detection of excess current in a circuit breaker, the trip assembly comprising:

a trip bar including a trip finger having a tripped position and an ON position;

a stationary armature bracket including a base portion and a spring-support portion;

a movable armature including a first end coupled to said base portion of said armature bracket, and a second end having a trip-actuating surface, said trip-actuating surface being disposed proximate said trip finger in the ON position and contacting said trip bar to initiate said tripped position, said second end further having a spring attachment means; and a spring directly coupled at its respective ends to said spring-support portion of said armature bracket and to said spring attachment means of said movable armature;

and wherein said spring directly controls the current rating of said trip mechanism without additional adjustment mechanisms.

2. The trip assembly of claim 1, wherein said trip finger has a rolled contact edge.

3. The trip assembly of claim 1, further comprising a stationary yoke separated from said movable armature by a magnetic gap, said magnetic gap being kept constant for a plurality of circuit breaker ratings.

4. The trip assembly of claim 3, wherein said magnetic gap is between approximately 0.085 inches and approximately 0.095 inches.

5. The trip assembly of claim 4, said movable armature further including two yoke surfaces, each of said yoke surfaces being aligned with respective ones of the two armature surfaces of said stationary yoke.

6. The trip assembly of claim 1, wherein said spring is inclined at an angle relative to a vertical axis of said armature bracket in either of said ON position or tripped position, said vertical axis being substantially perpendicular to said base portion of said armature bracket.

7. The trip assembly of claim 6, wherein said angle is approximately 17 degrees.

8. The trip assembly of claim 1, wherein said trip finger is separated from said movable armature by a trip-bar gap, said trip-bar gap being kept constant for a plurality of circuit breaker ratings.

9. The trip assembly of claim 8, wherein said trip-bar gap is between approximately 0.040 inches and approximately 0.050 inches.

10. The trip assembly of claim 1, said armature bracket further including a stop tab for holding said movable armature in a default position, said stop tab being located proximate said spring attachment means of said movable armature.

11. The trip assembly of claim 1, said first end of said movable armature being rotatively connected to said base portion of said armature bracket.

12. The trip assembly of claim 1, said movable armature having a plurality of cutouts for reducing the mass of said movable armature.

13. The trip assembly of claim 1, wherein said spring is one of:

a first spring having a first-spring constant selected to cause a tripping action in a circuit breaker having a first current rating; and a second spring having a second-spring constant selected to cause a tripping action in a circuit breaker having a second current rating.

14. A method of assembling trip-assembly components into a trip-assembly housing, comprising:

inserting an armature bracket into a trip-assembly housing, said armature bracket including a base portion and a spring-support portion;

operatively connecting a first end of a movable armature to said base portion of said armature bracket, said movable armature including a spring tab attachment means at a second end thereof opposite said first end, said second end thereof further having a trip-actuating surface;

directly coupling a first end of a spring to said spring-support portion of said armature bracket for exerting a direct force on said armature bracket; and directly coupling a second end of said spring to said spring attachment means of said movable armature for exerting a direct force on said movable armature whereby said spring directly controls the current rating of said trip mechanism without additional adjustment mechanisms.

15. The method of claim 14, further comprising positioning said spring at an angle relative to a vertical axis of said armature bracket, said vertical axis being substantially perpendicular to said base portion of said armature bracket in either of a tripped on untripped position of the trip assembly.

16. The method of claim 15, wherein said angle is approximately 17 degrees.

17. The method of claim 14, further comprising positioning said movable armature at a predetermined distance from a stationary yoke, said predetermined distance ranging from approximately 0.085 inches to approximately 0.095 inches.

18. The method of claim 14, further comprising positioning said movable armature at a predetermined distance from a trip finger of a trip bar, said predetermined distance being between approximately 0.040 inches and approximately 0.050 inches.

19. The method of claim 14, further comprising:

providing a stop tab in said armature bracket; and supporting said movable armature in a default position with said stop tab of said armature bracket.

20. The method of claim 14, further comprising:

selecting said spring to be a first spring having a first-spring constant for causing a tripping action in a circuit breaker having a first current rating; or selecting said spring to be a second spring having a second-spring constant for causing a tripping action in a circuit breaker having a second current rating.

* * * * *